(12) United States Patent
Tsai et al.

(10) Patent No.: US 8,289,460 B2
(45) Date of Patent: Oct. 16, 2012

(54) PIXEL STRUCTURE

(75) Inventors: Meng-Che Tsai, Taipei (TW);
Tung-Huang Chen, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 414 days.

(21) Appl. No.: 12/753,103

(22) Filed: Apr. 2, 2010

(65) Prior Publication Data

US 2011/0149184 A1 Jun. 23, 2011

(30) Foreign Application Priority Data

Dec. 18, 2009 (TW) .............................. 98143706 A

(51) Int. Cl.
G02F 1/1343 (2006.01)

(52) U.S. Cl. ......................................................... 349/38

(58) Field of Classification Search ................... 349/38, 349/39; 438/29, 30
See application file for complete search history.

(56) References Cited

U.S. PATENT DOCUMENTS

| | | | | |
|---|---|---|---|---|
| 4,728,172 A * | 3/1988 | Cannella | .......................... | 349/50 |
| 5,831,692 A * | 11/1998 | Lee | .................................. | 349/38 |
| 7,745,825 B2 * | 6/2010 | Ting | ................................. | 257/59 |
| 7,875,889 B2 * | 1/2011 | Choi et al. | ....................... | 257/72 |
| 7,951,628 B2 * | 5/2011 | Tseng | ............................... | 438/30 |
| 8,049,847 B2 * | 11/2011 | Lin et al. | ....................... | 349/114 |
| 8,203,682 B2 * | 6/2012 | Lee et al. | ....................... | 349/147 |
| 2002/0018152 A1 * | 2/2002 | Nagata et al. | ................... | 349/38 |
| 2003/0071930 A1 * | 4/2003 | Nagahiro | ......................... | 349/39 |
| 2005/0190312 A1 | 9/2005 | Yang | | |
| 2006/0119753 A1 * | 6/2006 | Luo et al. | ......................... | 349/38 |
| 2007/0103610 A1 * | 5/2007 | Lee et al. | ......................... | 349/38 |
| 2008/0100761 A1 * | 5/2008 | Ting et al. | ........................ | 349/38 |
| 2008/0225190 A1 * | 9/2008 | Chen et al. | ....................... | 349/38 |

FOREIGN PATENT DOCUMENTS

TW I288847 10/2007

* cited by examiner

*Primary Examiner* — Mark Robinson
*Assistant Examiner* — Robert Tavlykaev
(74) *Attorney, Agent, or Firm* — Jianq Chyun IP Office

(57) ABSTRACT

A pixel structure is provided. Each pixel region has a first pixel unit disposed on a first sub-pixel region and a second pixel unit disposed on a second sub-pixel region. A common line crossing over the first and the second sub-pixel regions has a first common electrode portion disposed within a first common capacitor region in the second sub-pixel region. A first capacitor electrode of the first pixel unit extends to the first common capacitor region from the first sub-pixel region, so that the first capacitor electrode overlaps the first common electrode portion to form a first extending capacitor. A second pixel electrode of the second pixel unit disposed within the second sub-pixel region. The second pixel electrode overlaps the first common electrode portion to constitute a second storage capacitor. The second storage capacitor and the first extending capacitor are stacked on the first common capacitor region.

20 Claims, 7 Drawing Sheets

PIXEL STRUCTURE

CROSS-REFERENCE TO RELATED APPLICATION

This application claims the priority benefit of Taiwan application serial no. 98143706, filed on Dec. 18, 2009. The entirety of the above-mentioned patent application is hereby incorporated by reference herein and made a part of specification.

BACKGROUND OF THE INVENTION

1. Field of the Invention

The present invention is relates to a pixel structure, and particularly to a pixel structure in which storage capacitors of different sub-pixels in the same pixel are configured in the same region.

2. Description of Related Art

With a progress in computer performance and a rapid development of Internet and multimedia technologies, the video apparatus or image device is developed to be light and compact. In the development of the display, with the progress in the optoelectronic techniques and the semiconductor manufacturing techniques, the liquid crystal display with the advantages of high definition, optimal space utilization, low power consumption, and no radiation has gradually become the main stream of the market.

With the development of the display panel, the liquid crystal display panel with the so-called half source driving (HSD) structure is developed. In the HSD structure, the number of the data lines is decreased so that the price of the source driver is decreased.

FIG. 1 is a schematic view showing a pixel structure of a conventional liquid crystal display panel, wherein the layout of the pixel structure 100 is designed based on the HSD structure. As shown in FIG. 1, the pixel structure 100 is electrically connected to the corresponding scan line 120 and the corresponding data line 130 and the pixel structure 100 is composed of a thin film transistor 140, which is connected to the scan line 120 and the data line 130, a pixel electrode 150, which is arranged to be corresponding to the thin film transistor 140, and a storage capacitor 160. The thin film transistor 140 is used as the switching device of the pixel structure 100, and the storage capacitor 160 is used to maintain the data voltage of the pixel electrode 150 without fluctuating resulted from the peripheral electrical field while the pixel structure 100 is turned off so that the display quality of the liquid crystal display panel can be well maintained.

Generally, in order to increase the voltage holding ratio of the pixel structure on the liquid crystal display panel, the area of the capacitor electrode is increased to increase the capacitance of the storage capacitor. Although the increasing of the area of the capacitor electrode can increase the capacitance of the storage capacitor in the pixel structure, the aperture ratio (opening ratio) of the pixel structure is decrease to lead to the decreasing of the brightness of the display. Hence, how to balance between the capacitance of the storage capacitor of the pixel structure and the aperture ratio of the pixel structure has become a challenge in the design of the pixel structure.

SUMMARY OF THE INVENTION

The present invention provides a pixel structure capable of increasing the capacitance per unit area of a storage capacitor so that the area occupied by the capacitor is decreased and the aperture ratio of the pixel structure is increase.

The invention provides a pixel structure disposed on a substrate to define a plurality of the pixel regions on the substrate. Each of the pixel regions has first sub-pixel region and a second sub-pixel region, and each of the second sub-pixel regions has a first common capacitor region. The pixel structure comprises a first scan line, a second scan line, a first data line and a second data line, a common line, a first pixel unit and a second pixel unit. The common line crosses over the first sub-pixel region and the second sub-pixel region, and the common line has a first common electrode portion disposed within the first common capacitor region. The first pixel unit includes a first active device, a first capacitor electrode and a first pixel electrode, wherein the first active device is electrically connected to the first scan line and the first data line, and the first pixel electrode is configured within the first sub-pixel region to be electrically connected to the first active device, and the first capacitor electrode is configured under the common line and electrically connected to the first active device. The first capacitor electrode comprises a first capacitor electrode portion and a first extending electrode portion. The first pixel electrode is connected to the first active device through the first capacitor electrode portion and the first extending electrode portion extends from the first capacitor electrode portion to the first common capacitor region so that the first extending electrode portion overlaps the first common electrode portion to form a first extending capacitor. Furthermore, the second pixel unit includes a second active device and a second pixel electrode, and the second active device is electrically connected to the second scan line and the second data line, and the second pixel electrode is configured within the second sub-pixel region to be electrically connected to the second active device. The second pixel electrode overlaps the first common electrode portion to form a second storage capacitor, and the second storage capacitor and the first storage capacitor are stacked in the first common capacitor region of the second sub-pixel region.

In one embodiment of the present invention, the first capacitor electrode can be, for example, configured between the first sub-pixel region and the second sub-pixel region so that the first capacitor electrode portion overlaps the common line to form a third storage capacitor.

In one embodiment of the present invention, in the first common capacitor region, the first common electrode portion can be, for example, configured between the second pixel electrode and the first extending electrode portion.

In one embodiment of the present invention, the pixel structure further comprises a first auxiliary electrode electrically connected to the common line and configured within the first common capacitor region and under the first capacitor electrode. The first auxiliary electrode overlaps the first extending electrode portion to form a first auxiliary capacitor.

In one embodiment of the present invention, the pixel structure further includes a second common capacitor region and the second common capacitor region is configured within the first sub-pixel region. Meanwhile, the common line can, for example, have a second common electrode portion extending to the second common capacitor region, and the second pixel unit has a second capacitor electrode. The second capacitor electrode and the first capacitor electrode are made from the same film. Specifically, the second capacitor electrode comprises a second capacitor electrode portion and a second extending electrode portion. The second pixel electrode is connected to the second active device through the second capacitor electrode portion. The second extending electrode extends from the second capacitor electrode portion to the second common capacitor region so that the second extending electrode portion overlaps the second common electrode portion to form a fourth extending capacitor.

In one embodiment of the present invention, in the second common capacitor region, the second common electrode portion can, for example, overlap the first pixel electrode to form a fifth storage capacitor of the first pixel unit. Furthermore, the fifth storage capacitor of the first pixel unit can be, for example, stacked on the fourth extending capacitor of the second pixel unit. Alternatively, the second capacitor electrode can be, for example, configured between the first sub-pixel region and the second sub-pixel region so that the second capacitor electrode portion overlaps the common line to form a sixth storage capacitor.

Moreover, in one embodiment of the present invention, in the second common capacitor region, the second common electrode portion can be, for example, configured between the first pixel electrode and the second extending electrode portion.

Further, in one embodiment of the present invention, the pixel structure further comprises a second auxiliary electrode electrically connected to the common line and configured within the second common capacitor region and under the second capacitor electrode. The second auxiliary electrode overlaps the second common electrode portion to form a second auxiliary capacitor.

In one embodiment of the present invention, the first active device and the second active device are configured on a diagonal line of the pixel region.

The present invention further provides a pixel structure. The pixel structure is disposed on a substrate to define a plurality of the pixel regions on the substrate. Each of the pixel regions has first sub-pixel region and a second sub-pixel region, and each of the second sub-pixel regions has a first common capacitor region. The pixel structure comprises a first scan line, a second scan line, a first data line and a second data line, a common line, a first pixel unit and a second pixel unit. The common line crosses over the first sub-pixel region and the second sub-pixel region and extends to the first common capacitor region. The first pixel unit comprises a first active device, a first pixel electrode and a first capacitor electrode, wherein the first active device is electrically connected to the first scan line and the first data line. The first pixel electrode is configured within the first sub-pixel region and electrically connected to the first active device. The first capacitor electrode extends to the first common capacitor region, and the first capacitor electrode overlaps the common line to form a first extending capacitor in the first common capacitor region. Moreover, the second pixel unit includes a second active device and a second pixel electrode, wherein the second active device is electrically connected to the second scan line and the second data line, and the second pixel electrode is configured within the second sub-pixel region to be electrically connected to the second active device, and the second pixel electrode overlaps the common line to form a second storage capacitor in the first common capacitor region. The first extending capacitor of the first pixel unit and the second storage capacitor of the second pixel unit are stacked in the first common capacitor region of the second sub-pixel region.

In one embodiment of the preset invention, the portion of the common line extending to the first common capacitor region forms a first common electrode portion, and the first common electrode portion overlaps the second pixel electrode to form a second storage capacitor. The first capacitor electrode comprises a first capacitor electrode portion and a first extending electrode portion. The first pixel electrode is connected to the first active device through the first capacitor electrode portion. The first extending electrode portion extends from the first capacitor electrode portion to the first common capacitor region so that the first extending electrode portion overlaps the first common electrode portion to form a first storage capacitor.

In one embodiment of the present invention, the first capacitor electrode is configured between the first sub-pixel region and the second sub-pixel region so that the first capacitor electrode portion overlaps the common line to form a third storage capacitor.

In one embodiment of the present invention, in the first common capacitor region, the first common electrode portion is configured between the second pixel electrode and the first extending electrode portion.

Further, in one embodiment of the present invention, the pixel structure further comprises a first auxiliary electrode electrically connected to the common line and configured within the first common capacitor region and under the first capacitor electrode. The first auxiliary electrode overlaps the first common electrode portion to form a first auxiliary capacitor.

In one embodiment of the present invention, the pixel structure further has a second common capacitor region within the first sub-pixel region, and the common line has a second common electrode portion extending to the second common capacitor region. Moreover, the second pixel unit has a second capacitor electrode, and the second capacitor electrode and the first capacitor electrode are made from the same film so that the second capacitor electrode comprises a second capacitor electrode portion and a second extending electrode portion. Specifically, the second capacitor electrode is connected to the second active device through the second capacitor electrode portion and the second extending electrode portion extends from the second capacitor electrode portion to the second common capacitor region. Therefore, the second extending electrode portion overlaps the second common electrode portion to form a fourth extending capacitor.

In one embodiment of the present invention, in the second common capacitor region, the second common electrode portion overlaps the first pixel electrode to form a fifth storage capacitor of the first pixel unit. Furthermore, the fifth storage capacitor of the first pixel unit can be, for example, stacked on the fourth extending capacitor of the second pixel unit. Alternatively, the second capacitor electrode can be, for example, configured between the first sub-pixel region and the second sub-pixel region so that the second capacitor electrode portion overlaps the common line to form a sixth storage capacitor.

Moreover, in one embodiment of the present invention, in the second common capacitor region, the second common electrode portion is configured between the first pixel electrode and the second extending electrode portion.

Further, in one embodiment of the present invention, the pixel structure further comprises a second auxiliary electrode electrically connected to the common line and configured within the second common capacitor region and under the second capacitor electrode. The second auxiliary electrode overlaps the second common electrode portion to form a second auxiliary capacitor.

In one embodiment of the present invention, the first active device and the second active device are configured on a diagonal line of the pixel region.

According to the above description, in the pixel structure of the present invention, the storage capacitors of two sub-pixel region are stacked on the same region so that the limited layout space can be fully used by the pixel structure to increase the capacitance per unit area of the capacitor. Therefore, the area occupied by the storage capacitor is decreased and the aperture ratio of the pixel structure is increased.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The invention provides a pixel structure, in which the capacitor electrode of one of the pixel units extends into the storage capacitor structure of the adjacent pixel unit. Basing on the multi-layered conductor structure in which the conductors are stacked on one another, the storage capacitors of a plurality of pixel units are formed in the same common capacitor region. Specifically, in the plurality of conductive lines stacked on one another, the conductor for electrically connecting to the common voltage is used as the middle layer, and the upper conductive layer and the lower conductive layer are electrically connected to different pixel electrodes of different pixel units respectively, for instance. Therefore, the capacitance per unit area of the capacitor can be greatly increased. Several embodiments of the present invention will be described in details in the following with reference to accompany the drawings.

Figure 1:
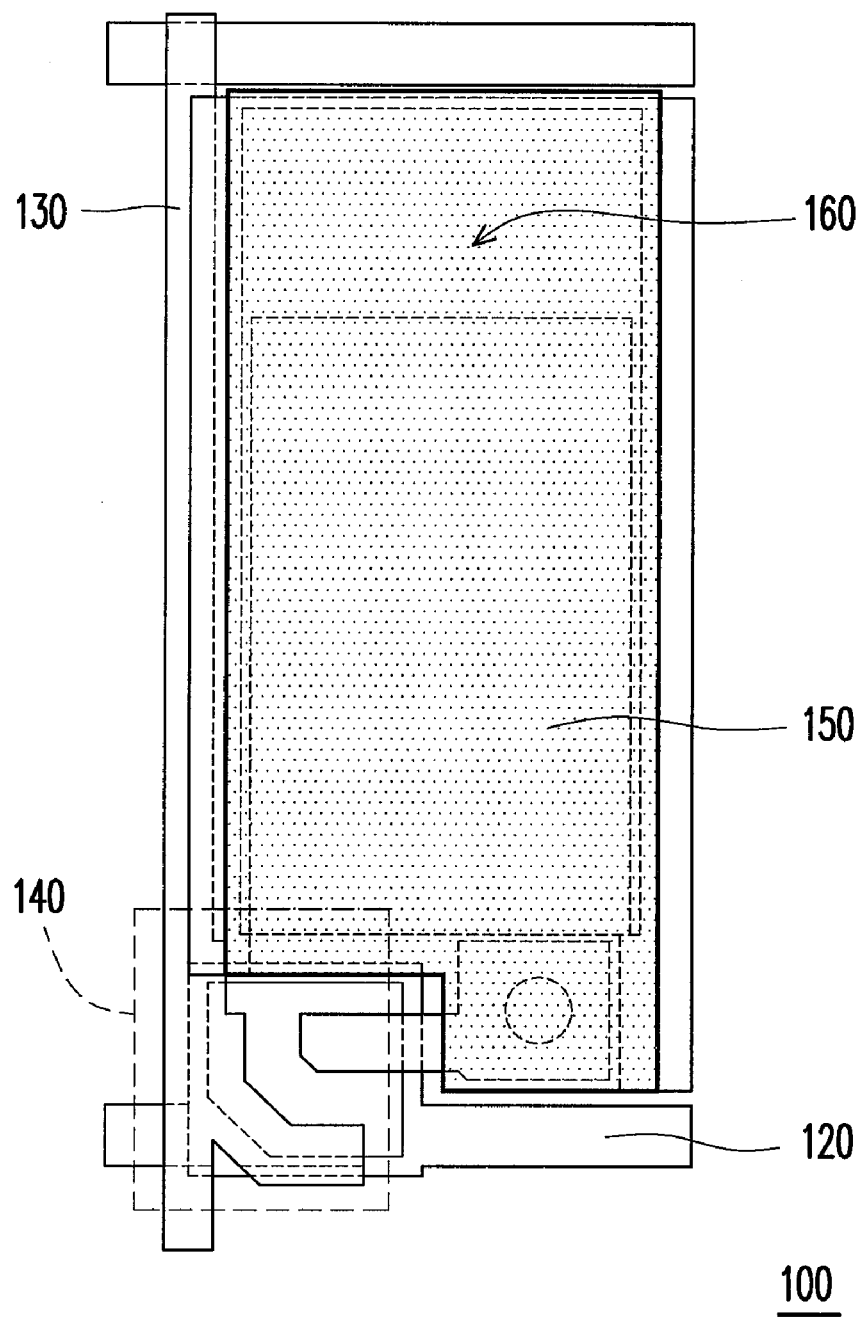
FIG. 1 is a schematic top view of a conventional pixel structure.
Figure 2:
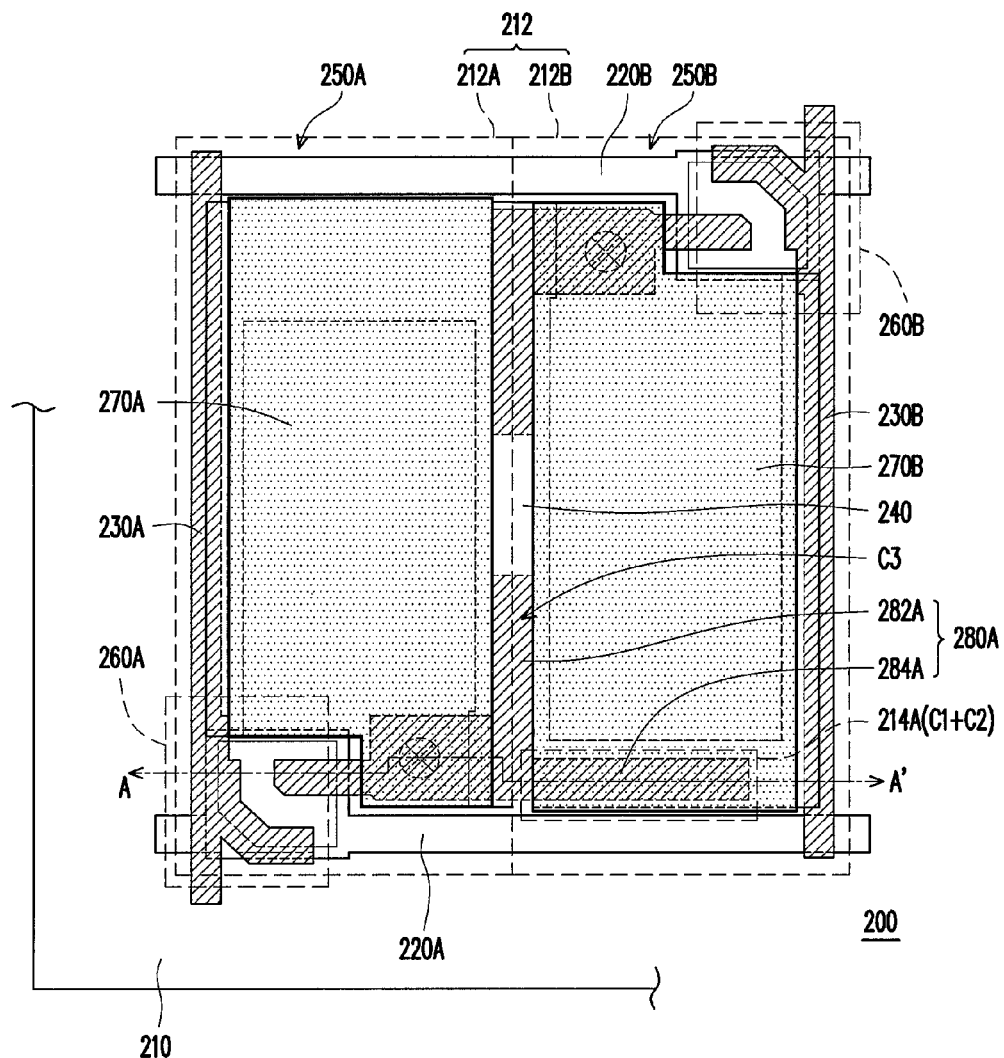
FIG. 2 is a schematic view of a pixel structure according to one embodiment of the present invention.

FIG. 2 is a schematic view of a pixel structure according to one embodiment of the present invention. As shown in FIG. 2, a pixel structure 200 is configured on a substrate 200 to define a plurality of pixel regions 212 on the substrate 200. In order to more clarify the related elements in the pixel structure 200, FIG. 2 only shows the pixel structure 200 in one of the pixel regions 212 as an exemplar of the present invention.

As shown in FIG. 2, each of the pixel regions 212 has a first sub-pixel region 212A and a second sub-pixel region 212B. The second sub-pixel region 212B has a first common capacitor region 214A. As shown in FIG. 2, the pixel structure 200 comprises a first scan line 220A and a second scan line 220B. The pixel structure 200 also comprises a first data line 230A and a second data line 230B perpendicular to the scan line 220A and the scan line 220B. The pixel structure 200 further comprises a common line 240, a first pixel unit 250A and a second pixel unit 250B. Furthermore, the first pixel unit 250A is mainly configured within the first sub-pixel region 212A and the second pixel unit 250B is mainly configured within the second sub-pixel region 212B. Particularly, an extending capacitor C1 of the first pixel unit 250A and a second storage capacitor C2 of the second pixel unit 250B are stacked together in the first common capacitor region 214A.

In order to detailed describe how the first extending capacitor C1 of the first pixel unit 250A and the second storage capacitor C2 of the second pixel unit 250B stack together in the first common capacitor region 214A, the pixel structure 200 shown in FIG. 2 is used as an example accompany the cross-sectional view along line AA' in FIG. 2 in the following description.

Figure 3:
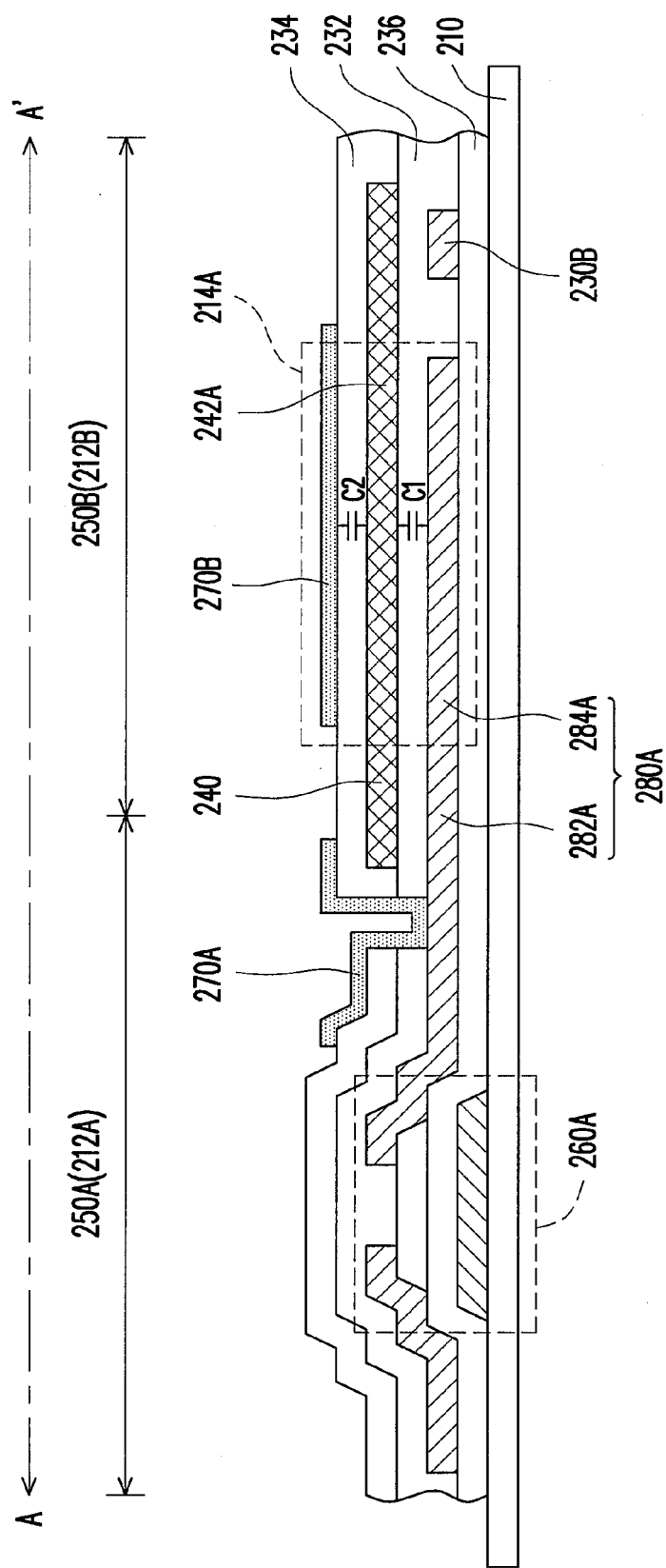
FIG. 3 is a schematic cross-sectional view of the pixel structure in FIG. 2 along line AA'.

FIG. 3 is a schematic cross-sectional view of the pixel structure in FIG. 2 along line AA'. As shown in FIG. 2 and FIG. 3, the common line 240 crosses over the first sub-pixel region 212A and the second sub-pixel region 212B and extends to the first common capacitor region 214A. Furthermore, the first pixel unit 250A comprises a first active device 260A, a first pixel electrode 270A and a first capacitor electrode 280A, wherein the first active device 260A is electrically connected to the first scan line 220A and the first data line 230A. The first pixel electrode 270A is configured within the first sub-pixel region 212A and electrically connected to the first active device 260A. The storage capacitor of the first pixel unit 250A is used to maintain the pixel voltage of the first pixel voltage 270A while the first active device 260A is turned off. It should be noticed that, as shown in FIG. 2 and FIG. 3, the first capacitor electrode 280A further outwardly extends from the first sub-pixel region 212A to the first common capacitor region 214A of the second sub-pixel region 212B so that the first capacitor electrode 280A overlaps the common line 240 in the first common capacitor region 214A to form a first storage capacitor C1. Since a portion of the first capacitor electrode 280A extending to the second sub-pixel region 212B is used as an electrode of the first storage capacitor C1, the first storage capacitor C1 is also called the first extending capacitor C1 in the following description.

Practically, the common line 240 is applied with a common voltage and the first capacitor electrode 280A is electrically connected to the first pixel electrode 270A so that the voltage level of the first capacitor electrode 280A is substantially equal to the first pixel voltage of the first pixel electrode 270A. Accordingly, the first extending capacitor C1 is mainly composed of the common line 240 with the common voltage, the first capacitor electrode 280A with the first pixel voltage and a first dielectric layer 232 configured between the common line 240 and the first capacitor electrode 280A.

As shown in FIG. 3 and FIG. 2, the second pixel unit 250B comprises a second active device 260B and a second pixel electrode 270B, wherein the second active device 260B is electrically connected to the second scan line 220B and the second data line 230B, and the second pixel electrode 270B is configured within the second sub-pixel region 212B and electrically connected to the second active device 260B. Further, in the present embodiment, the first active device 260A and the second active device 260B are configured on a diagonal line of the pixel region 212 respectively. Therefore, the first capacitor electrode 280A connected to the drain of the first active device 260A directly extends along the same side of the pixel structure 200 to the first common capacitor region 214A so as to decrease the possible loss of the aperture ration due to re-routing and to increase the area of the first common capacitor region 214A.

It should be noticed that the second pixel electrode 270A overlaps the common line 240 in the first common capacitor region 214A to form a second storage capacitor C2. Particularly, the first extending capacitor C1 of the first pixel unit 250A and the second storage capacitor C2 of the second pixel unit 250B are stack together in the first common capacitor region 214A of the second sub-pixel region 212B.

Accordingly, because the first extending capacitor C1 of the first pixel unit 250A is not configured within the first sub-pixel region 212A, under the consideration for maintaining the original designed capacitance of the storage capacitor, the aperture ratio of the first sub-pixel region 212A can be effectively increased. Moreover, since the first extending capacitor C1 is configured in the first common capacitor region 214A of the second sub-pixel region 212B and the first common capacitor region 214A is also originally designed for the second storage capacitor C2, the second pixel unit 250B can maintain the original aperture ratio. In the practical application, the first pixel unit 250A with a relatively large aperture ratio can be used as the major display unit and the second pixel unit 250B can be used as the minor display unit.

More specifically, as shown in FIG. 2 and FIG. 3, a portion of the common line 240 extending to the first common capacitor region 214A forms a first common electrode portion 242A, and the first capacitor electrode 280A includes a first capacitor electrode portion 282A and a first extending electrode portion 284A. As shown in FIG. 2 and FIG. 3, the first pixel electrode 270A is connected to the first active device 260A through the first capacitor electrode portion 282A, and the first extending electrode portion 284A extends from the first capacitor electrode portion 282A to the first common capacitor region 214A. Therefore, the first extending electrode portion 284A overlaps the first common electrode portion 242A to form the first extending capacitor C1. Further, the first common electrode portion 242A overlaps the second pixel electrode 270B to form the second storage capacitor C2. In other words, the first common electrode portion 242A can be, for example, configured between the second pixel electrode 270B and the first extending electrode portion 284A. That is, the first common electrode portion 242A is not only the upper electrode of the first storage capacitor C1 but also the lower electrode of the second storage capacitor C2. Moreover, in the preset embodiment, total storage capacitance of the first pixel unit 250A can be the sum of the capacitance of the first extending capacitor C1 and the capacitance of the third storage capacitor.

Under the consideration for further increasing the capacitance of the storage capacitor, the designer can further design a layout in which the first capacitor electrode portion 282A is configured between the first sub-pixel region 212A and the second sub-pixel region 212B so that the first capacitor electrode portion 282A overlaps the common line 240 to form the third storage capacitor C3, as shown in FIG. 2. Similarly, according to the aforementioned concept, the designer can also further improve the multi-layered conductor structure, in which the conductors are stacked on one another, in the capacitor region. For instance, FIG. 4 is a schematic cross-sectional view of the pixel structure in FIG. 2 along line AA' according to another embodiment of the present invention.

Figure 4:
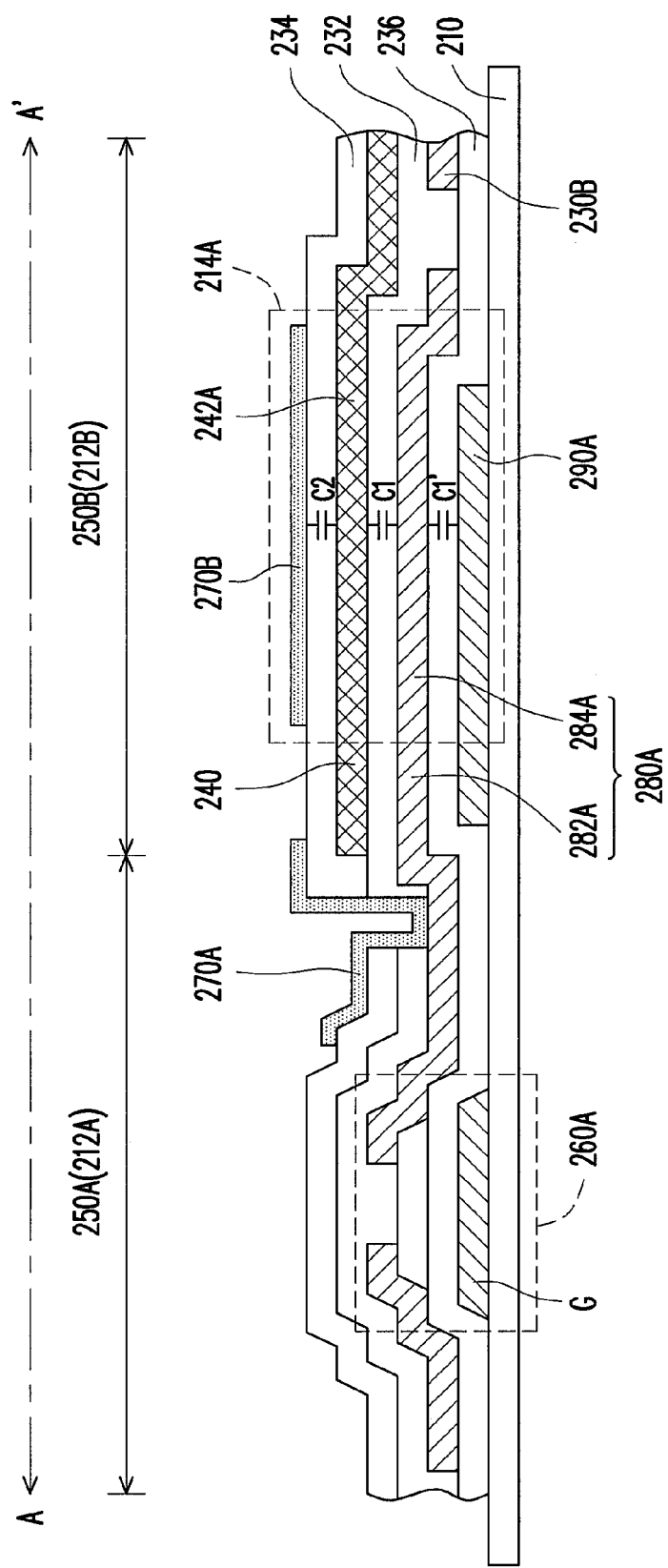
FIG. 4 is a schematic cross-sectional view of the pixel structure in FIG. 2 along line AA' according to another embodiment of the present invention.

As shown in FIG. 4, in the first common capacitor region 214A and around the multi-layered conductor structure, a first auxiliary electrode 290A is further configured under the first capacitor electrode 280A, and the first auxiliary electrode 290A and the gate G of the first active device 260A can be, for example, formed at the same process. That is, the first auxiliary electrode 290A and the gate G of the first active device 260A are formed from the same film. Practically, the first auxiliary electrode 290A is electrically connected to the common line 240 so that the first auxiliary electrode 290A, the first extending electrode portion 284A and the gate insulating layer 236 configured between the first auxiliary electrode 290A and the first extending electrode portion 284A together form a first auxiliary capacitor C1'. Hence, because of the first auxiliary capacitor C1', the capacitance of the first storage capacitor C1 can be further increased. Moreover, in the preset embodiment, total storage capacitance of the first pixel unit 250A can be the sum of the capacitance of the first extending capacitor the capacitance of the first auxiliary capacitor C1' and the capacitance of the third storage capacitor. It should be noticed that, in the present embodiment, the first auxiliary capacitor electrode 290A further extends from the first extending electrode portion 284A to a location under the first capacitor electrode portion 282A so that the storage capacitance of the first pixel unit 250A can be further increased.

Figure 5:
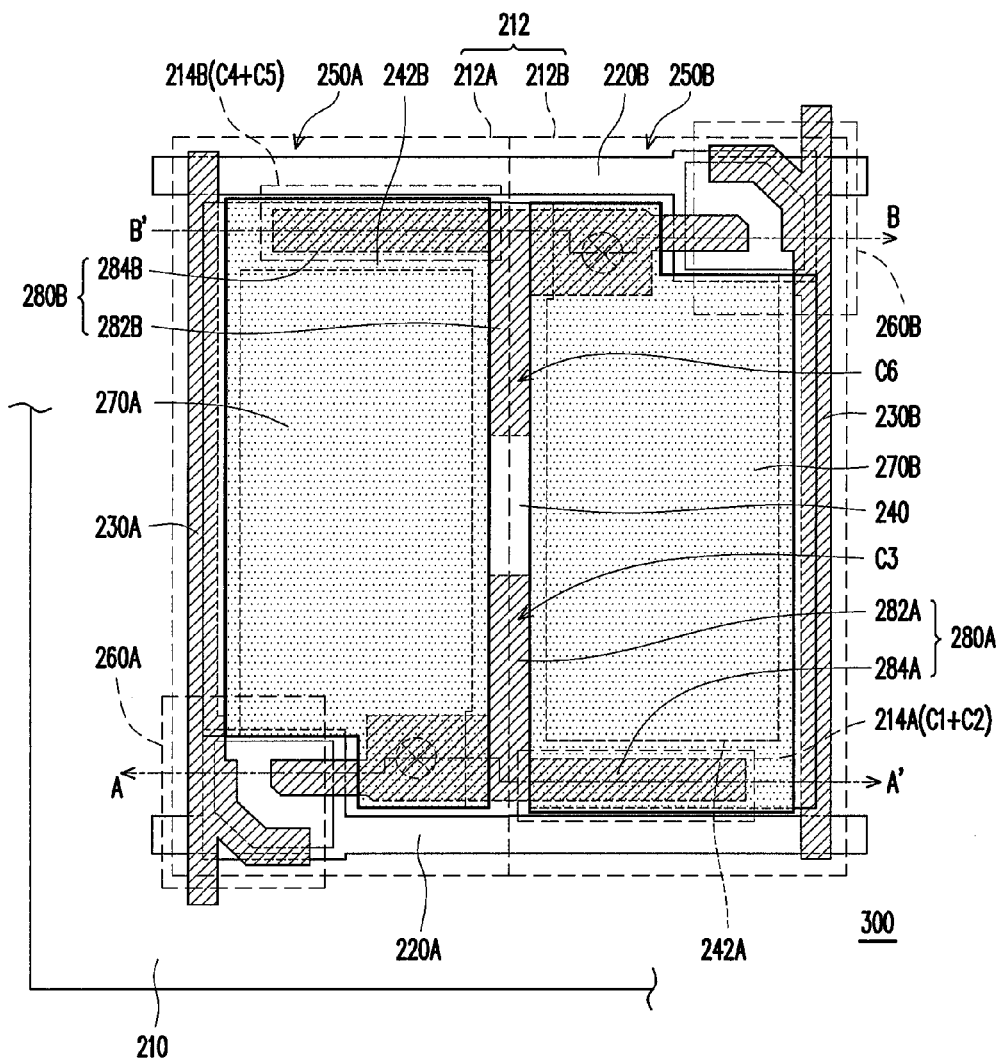
FIG. 5 is a top view of a pixel structure according to one embodiment of the present invention.

FIG. 5 is a top view of a pixel structure according to one embodiment of the present invention. As shown in FIG. 5, in the present embodiment, the pixel structure 300 is similar to the pixel structure described in the previous embodiments. However, in the pixel structure 300 of the present embodiment, each of the sub-pixel regions has a common capacitor region therein. That is, comparing with the pixel structure 200 in the aforementioned embodiment, the pixel structure 300 of the present embodiment further comprises a second common capacitor region 214 in the first pixel unit 250A. Furthermore, by following the aforementioned design spirit, the multi-layered conductor structure is configured in the second common capacitor region 214B so that the fourth extending capacitor C4 of the second pixel unit 250B and the fifth storage capacitor C5 of the first pixel unit 250A are stacked in the common capacitor region. Therefore, the storage capacitance per unit layout area is increased. Further, the layout area of the storage capacitor is decreased and the aperture ratio of the pixel structure 300 is increased.

In order to detailed describe how the fourth extending capacitor C4 of the second pixel unit 250B and the fifth storage capacitor C5 of the second pixel unit 250B stack together in the second common capacitor region 214B, the pixel structure 300 shown in FIG. 5 is taken as an example accompany the cross-sectional view along line BB' in FIG. 5 in the following description. Further, the cross-sectional view along line AA' in FIG. 5 can be referred to FIG. 3 and are not repeatedly described herein.

Figure 6:
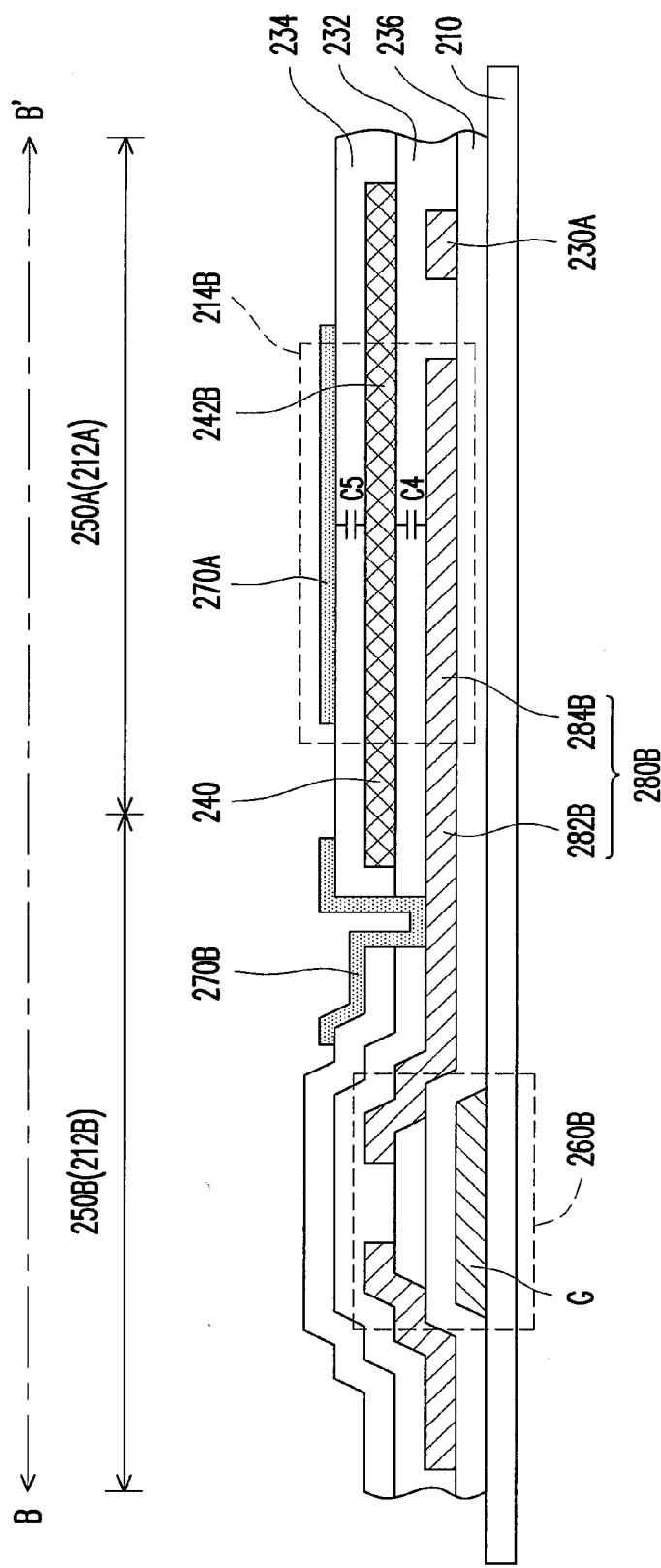
FIG. 6 is a schematic cross-sectional view of the pixel structure in FIG. 5 along line BB'.

FIG. 6 is a schematic cross-sectional view of the pixel structure in FIG. 5 along line BB'. As shown in FIG. 5 and FIG. 6, in the present embodiment, the pixel structure 300 not only comprises the first extending capacitor C1, the second storage capacitor C2 and the third storage capacitor C3 which are similar to those in the aforementioned pixel structure 200, but also has the common line 240, as shown in FIG. 5, having a second common electrode portion 242B extending to the second common capacitor region 214B. In addition, the second pixel unit 250B has a second capacitor electrode 280B, wherein the second capacitor electrode 280B and the first capacitor electrode 280A are formed from the same film and can be formed in the same photolithography and etching process.

Specifically, the second capacitor electrode 280B comprises a second capacitor electrode portion 282B and a second extending electrode portion 284B, wherein the second pixel electrode 270B is connected to the second active device 260B through the second capacitor electrode portion 282B so that the voltage level of the second capacitor electrode portion 282B is substantially equal to the voltage level of the second pixel electrode 270B. The second extending electrode portion 284B extends from the second capacitor electrode portion 282B to the second common capacitor region 214B so that the second extending electrode portion 284B overlaps the second common electrode portion 242B to form the fourth extending capacitor C4. Since the portion of second capacitor electrode 280B extending to the first sub-pixel region 212A is used as an electrode of the storage capacitor, the storage capacitor is so-called the fourth extending capacitor C4. Moreover, as shown in FIG. 5, in the second common capacitor region 214B, the second common electrode portion 242B overlaps the first pixel electrode 270A to form the fifth storage capacitor C5 of the first pixel unit 250A. Furthermore, the fifth storage capacitor C5 of the first pixel unit 250A can be, for example, stacked on the fourth extending capacitor C4 of the second pixel unit 250B.

Further, in the second common capacitor region 214B, the second common electrode portion 242B is configured between the first pixel electrode 270A and the second extending electrode portion 284B so that the second common electrode portion 242B is not only the upper electrode of the fourth storage capacitor C4 but also the lower electrode of the fifth storage capacitor C5.

As shown in FIG. 6 and FIG. 3, practically, the common line 240 is applied with a common voltage and the first capacitor electrode 280A and the second capacitor electrode 280B are electrically connected to the first pixel electrode 270A and the second pixel electrode 270B respectively. Hence, as shown in FIG. 3, in the first common capacitor region 214A, the first extending capacitor C1 is mainly composed of the first common electrode portion 242A with the common voltage, the first capacitor electrode 280A with the first pixel voltage and the first dielectric layer 232 configured between the first common electrode portion 242A and the first capacitor electrode 280A. Also, the second storage capacitor C2 is mainly composed of the first common electrode portion 242A with the common voltage, the second pixel electrode 270B with the second pixel voltage and a second dielectric layer 234 configured between the first common electrode portion 242A and the second pixel electrode 270B. Moreover, as shown in FIG. 6, in the second common capacitor region 214B, the fourth extending capacitor C4 is mainly composed of the second common electrode portion 242B with the common voltage, the second capacitor electrode 280B with the second pixel voltage and the first dielectric layer 232 configured between the second common electrode portion 242B and the second capacitor electrode 280B. Also, the fifth storage capacitor C5 is mainly composed of the second common electrode portion 242B with the common voltage, the first pixel electrode 270A with the first pixel voltage and the second dielectric layer 234 configured between the second common electrode portion 242B and the first pixel electrode 270A.

As shown in FIG. 5 and FIG. 6, in the second pixel unit 250B, the required storage capacitors are configured in the adjacent first pixel unit 250A and the first sub-pixel region 212A so that, under the circumstance that the original designed capacitance of the storage capacitor is maintained, the aperture ratio of the second pixel unit 250B is further increased. Thus, in the present embodiment, because the capacitance per unit area of the capacitors in both of the first pixel unit 250A and the second pixel unit 250A can be increased, the total aperture ratio of the pixel structure 300 can be increased. Practically, the first pixel unit 250A and the second pixel unit 250B can be the sub-display units respectively for constituting the pixel structure 300.

Under the consideration for further increasing the capacitance of the storage capacitor of the second pixel unit 250B, the designer can further design a layout in which the second capacitor electrode portion 282B is configured between the first sub-pixel region 212A and the second sub-pixel region 212B so that the first capacitor electrode portion 282A overlaps the common line 240 to form a six storage capacitor C6, as shown in FIG. 5. In the present embodiment, the total capacitance of the storage capacitors of the first pixel unit 250A can be the sum of the capacitance of the first extending capacitor, the capacitance of the third storage capacitor and the capacitance of the fifth storage capacitor. Also, the total capacitance of the storage capacitors of the second pixel unit 250B can be the sum of the capacitance of the second capacitor C2, the capacitance of the fourth extending capacitor C4 and the capacitance of the sixth storage capacitor C6.

Figure 7:
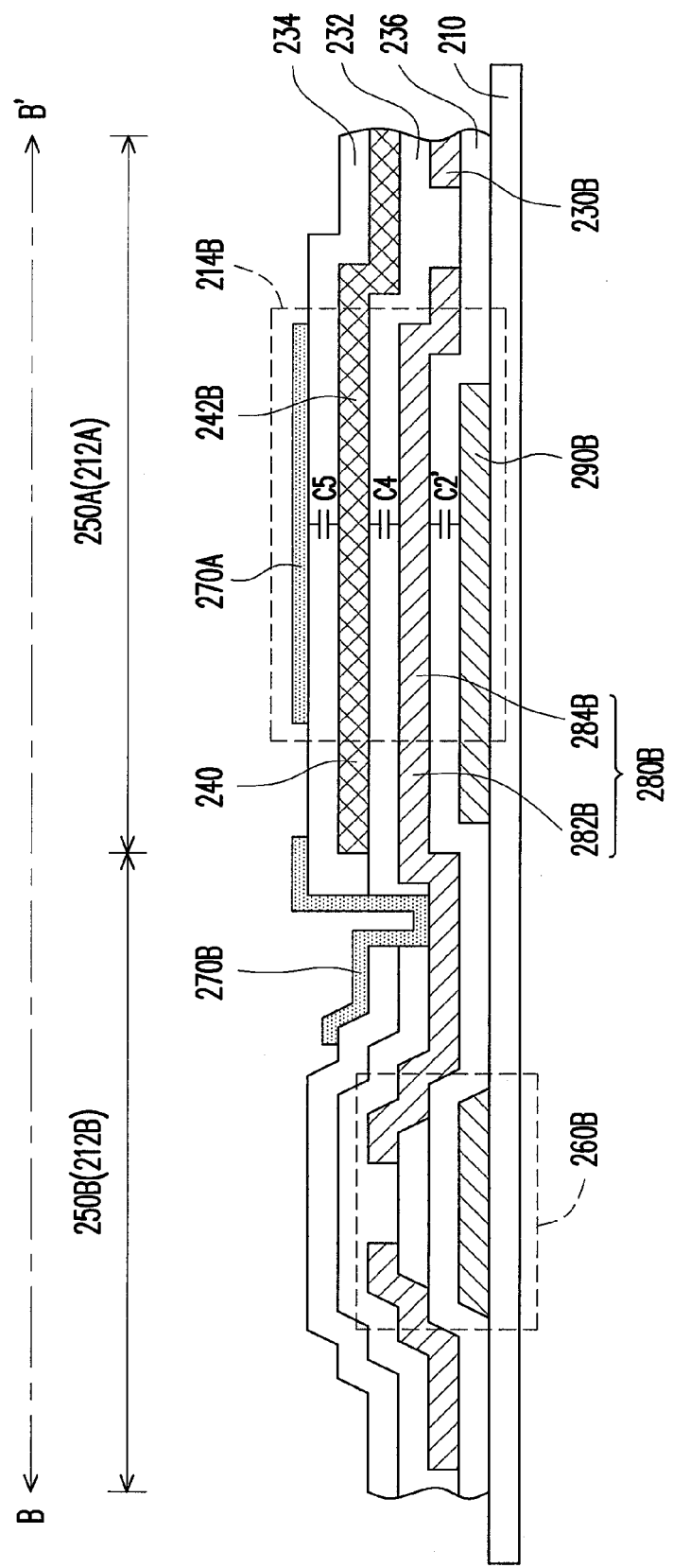
FIG. 7 is another schematic cross-sectional view of the pixel structure in FIG. 5 along line BB'.

Similarly, according to the aforementioned concept, the designer can also further improve the multi-layered conductor structure, in which the conductors are stacked on one another, in the capacitor region. For instance, FIG. 7 is a schematic cross-sectional view of the pixel structure in FIG. 5 along line BB' according to another embodiment of the present invention. As shown in FIG. 7, in the second common capacitor region 214B and around the multi-layered conductor structure, a second auxiliary electrode 290B is further configured under the second capacitor electrode 280B. The method for forming the second auxiliary electrode 290B is similar to the method for forming the first auxiliary electrode 290A. That is, the second auxiliary electrode 290B and the gate G of the second active device 260B are formed from the same film. Practically, the second auxiliary electrode 290B and the first auxiliary electrode 290A are electrically connected to the common line 240 so that the second auxiliary electrode 290B, the second extending electrode portion 284B and the gate insulating layer 236 configured between the second auxiliary electrode 290B and the second extending electrode portion 284B together form a second auxiliary capacitor C2'. Hence, because of the second auxiliary capacitor C2', the capacitance of the fourth storage capacitor C4 can be further increased. Briefly, in the present embodiment, the total capacitance of the storage capacitors of the second pixel unit 250B is the sum of the capacitance of the second storage capacitor C2, the capacitance of the fourth extending capacitor C4, the capacitance of the second auxiliary capacitor C2' and the capacitance of the sixth storage capacitor C6. It should be noticed that, in the present embodiment, the second auxiliary capacitor electrode 290B further extends from the second extending electrode portion 284B to a location under the second capacitor electrode portion 282B so that the storage capacitance of the second pixel unit 250B can be further increased.

According to the above description, in the pixel structure of the present invention, the storage capacitors of two sub-pixel region are stacked together on the same region so that the limited layout space can be fully used by the pixel structure of the present invention to increase the capacitance per unit area of the capacitor. Therefore, the area occupied by the storage capacitor is decreased and the aperture ratio of the pixel structure is increased.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A pixel structure disposed on a substrate to define a plurality of pixel regions on the substrate, wherein each of the pixel regions has a first sub-pixel region and a second sub-pixel region, and each of the second sub-pixel regions has a first common capacitor region, the pixel structure comprising:

a first scan line, a second scan line, a first data line and a second data line;

a common line crossing over the first sub-pixel region and the second sub-pixel region, wherein the common line has a first common electrode portion disposed within the first common capacitor region;

a first pixel unit including a first active device, a first capacitor electrode and a first pixel electrode, wherein the first active device is electrically connected to the first scan line and the first data line, and the first pixel electrode is configured within the first sub-pixel region to be electrically connected to the first active device, and the first capacitor electrode is configured under the common line and electrically connected to the first active device, and the first capacitor electrode comprises:

a first capacitor electrode portion, wherein the first pixel electrode is connected to the first active device through the first capacitor electrode portion; and a first extending electrode portion extending from the first capacitor electrode portion to the first common capacitor region so that the first extending electrode portion overlaps the first common electrode portion to form a first extending capacitor;

a second pixel unit comprising a second active device and a second pixel electrode, wherein the second active device is electrically connected to the second scan line and the second data line, and the second pixel electrode is configured within the second sub-pixel region to be electrically connected to the second active device, and the second pixel electrode overlaps the first common electrode portion to form a second storage capacitor, and the second storage capacitor and the first storage capacitor are stacked in the first common capacitor region of the second sub-pixel region.

2. The pixel structure of claim 1, wherein the first capacitor electrode portion is configured between the first sub-pixel region and the second sub-pixel region, and the first capacitor electrode portion overlaps the common line to form a third storage capacitor of the first pixel unit.

3. The pixel structure of claim 1, wherein, in the first common capacitor region, the first common electrode portion is configured between the second pixel electrode and the first extending electrode portion.

4. The pixel structure of claim 1 further comprising a first auxiliary electrode electrically connected to the common line and configured within the first common capacitor region and under the first capacitor electrode, wherein the first auxiliary electrode overlaps the first extending electrode portion to form a first auxiliary capacitor.

5. The pixel structure of claim 1 further comprising a second common capacitor region configured within the first sub-pixel region, wherein the common line has a second common electrode portion extending to the second common capacitor region, and the second pixel unit has a second capacitor electrode, and the second capacitor electrode and the first capacitor electrode are made from a same film and the second capacitor electrode comprises:

a second capacitor electrode portion, wherein the second pixel electrode is connected to the second active device through the second capacitor electrode portion; and a second extending electrode portion extending from the second capacitor electrode portion to the second common capacitor region so that the second extending electrode portion overlaps the second common electrode portion to form a fourth extending capacitor.

6. The pixel structure of claim 5, wherein, in the second common capacitor region, the second common electrode portion overlaps with the first pixel electrode to form a fifth storage capacitor of the first pixel unit, and the fifth storage capacitor of the first pixel unit is stacked on the fourth extending capacitor of the second pixel unit.

7. The pixel structure of claim 5, wherein the second capacitor electrode is configured between the first sub-pixel region and the second sub-pixel region, and the second capacitor electrode portion overlaps the common line to form a sixth storage capacitor.

8. The pixel structure of claim 5, wherein, in the second common capacitor region, the second common electrode portion is configured between the first pixel electrode and the second extending electrode portion.

9. The pixel structure of claim 5 further comprising a second auxiliary electrode electrically connected to the common line and configured within the second common capacitor region and under the second capacitor electrode, wherein the second auxiliary electrode overlaps the second common electrode portion to form a second auxiliary capacitor.

10. The pixel structure of claim 1, wherein the first active device and the second active device are configured on a diagonal line of the pixel region.

11. A pixel structure disposed on a substrate to define a plurality of pixel regions on the substrate, wherein each of the pixel regions has a first sub-pixel region and a second sub-pixel region, and each of the second sub-pixel regions has a first common capacitor region, the pixel structure comprising:

a first scan line, a second scan line, a first data line and a second data line;

a common line crossing over the first sub-pixel region and the second sub-pixel region and extending to the first common capacitor region;

a first pixel unit including a first active device, a first capacitor electrode and a first pixel electrode, wherein the first active device is electrically connected to the first scan line and the first data line, and the first pixel electrode is configured within the first sub-pixel region to be electrically connected to the first active device, and the first capacitor electrode extends to the first common capacitor region, and the first capacitor electrode overlaps the common line to form a first extending capacitor in the first common capacitor region;

a second pixel unit including a second active device and a second pixel electrode, wherein the second active device is electrically connected to the second scan line and the second data line, and the second pixel electrode is configured within the second sub-pixel region to be electrically connected to the second active device, and the second pixel electrode overlaps the common line to form a second storage capacitor in the first common capacitor region, and the first extending capacitor of the first pixel unit and the second storage capacitor of the second pixel unit are stacked in the first common capacitor region of the second sub-pixel region.

12. The pixel structure of claim 11, wherein a portion of the common line extending to the first common capacitor region forms a first common electrode portion, and the first common electrode portion overlaps the second pixel electrode to form a second storage capacitor, and the first capacitor electrode comprises:

a first capacitor electrode portion, wherein the first pixel electrode is connected to the first active device through the first capacitor electrode portion; and a first extending electrode portion extending from the first capacitor electrode portion to the first common capacitor region so that the first extending electrode portion overlaps the first common electrode portion to form a first storage capacitor.

13. The pixel structure of claim 12, wherein the first capacitor electrode is configured between the first sub-pixel region and the second sub-pixel region, and the first capacitor electrode portion overlaps the common line to form a third storage capacitor.

14. The pixel structure of claim 12, wherein, in the first common electrode region, the first common electrode portion is configured between the second pixel electrode and the first extending electrode portion.

15. The pixel structure of claim 12 further comprising a first auxiliary electrode electrically connected to the common line and configured within the first common capacitor region and under the first capacitor electrode, wherein the first auxiliary electrode overlaps the first common electrode portion to form a first auxiliary capacitor.

16. The pixel structure of claim 12 further comprising a second common capacitor region configured within the first sub-pixel region, wherein the common line has a second common electrode portion extending to the second common capacitor region, and the second pixel unit has a second capacitor electrode, and the second capacitor electrode and the first capacitor electrode are made from a same film and the second capacitor electrode comprises:
   a second capacitor electrode portion, wherein the second pixel electrode is connected to the second active device through the second capacitor electrode portion; and
   a second extending electrode portion extending from the second capacitor electrode portion to the second common capacitor region so that the second extending electrode portion overlaps the second common electrode portion to form a fourth extending capacitor,
wherein, in the second common capacitor region, the second common electrode portion overlaps the first pixel electrode to form a fifth storage capacitor of the first pixel unit, and the fifth storage capacitor of the first pixel unit is stacked on the fourth extending capacitor of the second pixel unit.

17. The pixel structure of claim 16, wherein the second capacitor electrode is configured between the first sub-pixel region and the second sub-pixel region, and the second capacitor electrode portion overlaps the common line to form a sixth storage capacitor.

18. The pixel structure of claim 16, wherein, in the second common capacitor region, the second common electrode portion is configured between the first pixel electrode and the second extending electrode portion.

19. The pixel structure of claim 16 further comprising a second auxiliary electrode electrically connected to the common line and configured within the second common capacitor region and under the second capacitor electrode, wherein the second auxiliary electrode overlaps the second common electrode portion to form a second auxiliary capacitor.

20. The pixel structure of claim 11, wherein the first active device and the second active device are configured on a diagonal line of the pixel region.

* * * * *